United States Patent
Pascal et al.

(10) Patent No.: US 11,459,477 B2
(45) Date of Patent: Oct. 4, 2022

(54) ADHESIVE COMPOSITION BASED ON ETHYLENE COPOLYMERS, USEFUL FOR EXTRUSION-COATING AND EXTRUSION-LAMINATION ON A VARIETY OF SUPPORTS

(75) Inventors: Jerome Pascal, Grandchain (FR);
Fabrice Chopinez, Evreux (FR);
Damien Rauline,
Saint-Quentin-des-Isles (FR)

(73) Assignee: SK GLOBAL CHEMICAL CO., LTD., Seoul (KR)

( * ) Notice: Subject to any disclaimer, the term of this patent is extended or adjusted under 35 U.S.C. 154(b) by 2221 days.

(21) Appl. No.: 11/721,716

(22) PCT Filed: Dec. 13, 2005

(86) PCT No.: PCT/FR2005/003110
§ 371 (c)(1),
(2), (4) Date: Aug. 13, 2009

(87) PCT Pub. No.: WO2006/064117
PCT Pub. Date: Jun. 22, 2006

(65) Prior Publication Data
US 2009/0297857 A1 Dec. 3, 2009

(30) Foreign Application Priority Data
Dec. 16, 2004 (FR) ..................... 04.13384

(51) Int. Cl.
*C09D 123/08* (2006.01)
*C09J 123/08* (2006.01)

(52) U.S. Cl.
CPC .. *C09D 123/0869* (2013.01); *C09J 123/0869* (2013.01); *Y10T 428/3154* (2015.04); *Y10T 428/3175* (2015.04); *Y10T 428/31699* (2015.04); *Y10T 428/31797* (2015.04); *Y10T 428/31935* (2015.04)

(58) Field of Classification Search
CPC combination set(s) only.
See application file for complete search history.

(56) References Cited

U.S. PATENT DOCUMENTS

| | | | |
|---|---|---|---|
| 2,391,218 A | | 12/1945 | Bacon et al. |
| 3,410,928 A | | 11/1968 | Baum et al. |
| 4,026,967 A | | 5/1977 | Flexman, Jr. et al. |
| 4,087,588 A | | 5/1978 | Shida et al. |
| 4,427,833 A | | 1/1984 | Edwards |
| 4,612,349 A | * | 9/1986 | Nicco et al. ............... 525/117 |
| 4,868,052 A | | 9/1989 | Guerdoux et al. |
| 5,053,457 A | | 10/1991 | Lee |
| 5,532,066 A | | 7/1996 | Latiolais et al. |
| 5,631,325 A | * | 5/1997 | Latiolais et al. ............ 525/227 |
| 6,323,308 B1 | * | 11/2001 | Kobayashi et al. ......... 528/354 |
| 6,773,735 B1 | * | 8/2004 | Dalgewicz, III ............ 426/127 |
| 8,020,897 B2 | * | 9/2011 | Katayama et al. ........... 285/256 |
| 2002/0198323 A1 | | 12/2002 | Morris |
| 2003/0194566 A1 | | 10/2003 | Corzani et al. |
| 2004/0028932 A1 | | 2/2004 | Holzer et al. |
| 2004/0260012 A1 | | 12/2004 | Krabbenborg et al. |
| 2007/0264512 A1 | | 11/2007 | Mehta et al. |
| 2010/0034919 A1 | * | 2/2010 | Brothers .............. B32B 27/40 |
| | | | 425/461 |

FOREIGN PATENT DOCUMENTS

| | | | |
|---|---|---|---|
| DE | 10020651 | | 11/2000 |
| EP | 0 222 789 B1 | | 5/1987 |
| EP | 0 444 865 A2 | | 9/1991 |
| EP | 0 995 590 A1 | | 4/2000 |
| EP | 1 136 536 B1 | | 9/2001 |
| EP | 1237947 B1 | | 9/2002 |
| EP | 1702955 B1 | | 9/2006 |
| GB | 991568 | | 5/1965 |
| JP | 06-234194 | * | 8/1994 |
| JP | 09-125032 | * | 5/1997 |
| WO | WO91/02760 | * | 3/1991 |
| WO | WO 91/02760 | | 3/1991 |
| WO | WO 2004/076507 A3 | | 9/2004 |

OTHER PUBLICATIONS

"Ultra-versatile Adhesives to broaden the possbiliites of Extrusion Lamination" Dr. Jerome Pascal; 2006 PLACE Conference (Sep. 17-21) Cincinnati Ohio.*
"Using Primers in Combination with Adhesive Tie-layer Resins or their blends to make structures with Unique Performance" Richard Allen; 2005 PLACE Conference (Sep. 27-29) Las Vegas Nevada.*
Anonymous: "Lotader maleic anhydride (MAH)", Internet Article dated Jun. 27, 2004, XP002339265, http://www.arkemainc.com/pdf/techpoly/lotadermah_grades.pdf.
Atofina, Lotader 4700 (Jun. 2000), 2 pages.

(Continued)

*Primary Examiner* — Kevin R Kruer
(74) *Attorney, Agent, or Firm* — Buchanan Ingersoll & Rooney P.C.

(57) ABSTRACT

The invention concerns an adhesive composition consisting of at least one ethylene polymer or copolymer, said composition comprising at least one unsaturated carboxylic acid ester comonomer, and at least one functional comonomer, useful in an extrusion-coating process for application on a support or in an extrusion-lamination process for bonding together several supports of different type or not, in a wide temperature range. The invention is characterized in that said composition has an unsaturated carboxylic acid ester content higher than 5 wt % and in that the functional comonomer consists of at least one reactive function in the form of an acid group, anhydride or epoxy, whereof the proportion is less than 1 wt % of the composition. Said composition has advantageous uses, in particular for bonding together substrates selected among aluminum, paper or cardboard, cellophane, films based of polyethylene, polypropylene, polyamide, polyester, polyvinyl chloride (PVC), polyvinylidene chloride (PVDC), polyacrylonitrile (PAN) resins, oriented or not, metal-coated or not, physically or chemically treated or not and films coated with a thin inorganic barrier layer, such as polyester (PET, SiOx or AlOx).

13 Claims, No Drawings

(56) References Cited

OTHER PUBLICATIONS

European Opposition in the Westlake Chemical Corp., in European Patent No. 1 836 269, published by the European Patent Office on Jun. 21, 2012.
Technical Data Sheet of Lotader 4700; dated Jun. 2000, 1 page.
Johnson W., Invitation to Organic Chemistry (Invitation à la chimie organique p. 647 A William Johnson 2dité par De Boeck (2003) ISBN 10: 2744501387), 5 pages.
Rebstein M., "Advanced Chemistry Bac preparation and maturity" (Chimie avancée Préparation au bac et à la maturité Martine Rebstein C. Presses Polytechniques, Lausanne 2011 ISBN 978-2-88074-927-9), 6 pages.
McCord E. F. et al., Short-Chain Branching Structures in Ethylene Copolymers Prepared by High-Pressure Free-Radical Polymerization: An NMR Analysis; Macromolecules, 1997, vol. 30, No. 2, pp. 246-256.
A Guide to Polyolefin Extrusion Coating de Equistar—A Lyondell Company,1997, 5 pages.
Thermoplastic Materials Christopher C. Ibeh Publisher: Taylor and Francis Date Published: Apr. 25, 2011 ISBN: 978-1-4200-9383-4, 3 pages.

Notice of Opposition issued by the European Patent Office dated Jun. 21, 2012 in European Patent Application EP 05825989.6, (23 pages).
Opposition decision dated Mar. 15, 2017, in European Application EP 1836269,.6-1302, 9 pages.
Letter of the opponent dated Nov. 20, 2014, in European Patent Application 05825989.6, 18 pages.
Statement of Grounds for appeal in EP 05825989.6, dated May 20, 2020, European Patent Office, The Hague, (54 pages).
Letter relating to the Appeal procedure, Dec. 2, 2020, (9 pages).
1997 polymers, Lamination & Coating Conference, 203-209, figures 1 to 3, Keys To Good Adhesion in Coextrusion Coating: Interactions Between Tie Resin Nature and Pre-Treatments, (10 pages).
Reply to Appeal EP05825989.6, European Patent Office, The Hague, dated Oct. 20, 2020, (23 pages).
"A Guide to Polyolefin Extrusion Coating" of Lyondell Basell, pp. 36 to 38, 1997.
Product leaflet LOTRYL, dated May 18, 2020, of Arkema France., (2 pages).
Pages 14 to 18 of the original opposition writ., (5 pages).

* cited by examiner

ADHESIVE COMPOSITION BASED ON ETHYLENE COPOLYMERS, USEFUL FOR EXTRUSION-COATING AND EXTRUSION-LAMINATION ON A VARIETY OF SUPPORTS

This application claims benefit, under U.S.C. § 119 or § 365 of PCT application PCT/FR2005/003110, filed Dec. 13, 2005; and French Application Number FR 04.13384, filed Dec. 16, 2004.

FIELD OF THE INVENTION

The present invention relates to an adhesive composition or tie based on one or more ethylene polymers or copolymers, that can be used in an extrusion-coating process for application onto a support or in an extrusion-lamination process to bond several supports, possibly being of the same or different nature, together, one of these supports possibly being, in particular, aluminum.

BACKGROUND OF THE INVENTION

It is known to use ethylene/(meth)acrylic acid copolymers as a tie for extrusion-coating onto an aluminum support; however, these copolymers only adhere to a limited number of supports, and in particular do not adhere to oriented plastic films such as polyester (OPET), polypropylene (OPP) or polyamide (OPA).

Document FR 98 13248 describes a tie of the ethylene/alkyl (meth)acrylate/glycidyl methacrylate (GMA) terpolymer type for bonding a polyester film such as corona-treated polyethylene terephthalate (PET) onto another substrate such as polyethylene (PE); however, the versatility for bonding onto other substrates is limited.

Document EP 444 865 describes ties of the sealable-peelable type for aluminum lids for plastic packaging, of which the compositions comprise, as a blend, ethylene/vinyl acetate (EVA) or ethylene/alkyl (meth) acrylate copolymers, with ethylene/unsaturated acid or its anhydride/unsaturated ester terpolymers. These ties which must be sealable and peelable are not used as ties for extrusion-coating and extrusion-lamination between an aluminum support and a thermoplastic support.

Document EP 1 136 536 describes a coextrusion tie comprising:
 5 to 35 parts of a polymer (A) itself composed of a blend of 80 to 20 parts of a metallocene polyethylene (A1) and 20 to 80 parts of a non-metallocene LLDPE polyethylene (A2), the blend (A1)+(A2) being cografted by an unsaturated carboxylic acid; and
 95 to 65 parts of a polyethylene (B) chosen from polyethylene homopolymers or copolymers and elastomers,
the blend of (A) and (B) being such that the content of grafted unsaturated carboxylic acid is between 30 and 100 000 ppm.

These compositions, which are very effective in coextrusion, are not very high-performance in extrusion-coating and extrusion-lamination technologies, on certain supports such as oriented polyethylene terephthalate (OPET).

Document EP 222 789 describes a thermoplastic composition composed of a blend of an ethylene-based polymer or copolymer and an ethylene/alkyl (meth)acrylate/maleic anhydride terpolymer; in the examples describing the use of this composition in coating an aluminum support, the terpolymer is used as a blend with 15 to 50 wt % of a radical polyethylene, which gives maleic anhydride contents between 1.4 and 2.5 wt %. This type of composition, due to its high maleic anhydride content, is very sensitive to moisture and, in addition, its adhesion properties to films made of OPET, OPA and OPP are mediocre.

Document US 2002/0198323 A1 describes a polymer blend used for high-speed coating of a polar substrate such as an aluminum foil, comprising low-density polyethylene (LDPE) (at least 55 wt %) and a copolymer having a low acid content which is an ethylene/(meth)acrylic acid copolymer, which may contain from 0 to 20 wt % of another ethylenically unsaturated comonomer. Preferably, this copolymer having a low acid content is an ethylene/(meth)acrylic acid/isobutyl acrylate terpolymer, having a content of the latter comonomer between 1 and 8 wt % of the terpolymer, namely at most 3.6% in the blend. This type of formulation only adheres to a limited number of supports such as aluminum, paper and polyethylene.

The Applicant has found that it was possible, surprisingly, to significantly improve the adhesion properties of an adhesive composition or tie, composed of at least one ethylene polymer or copolymer, applied to a support by an extrusion-coating process or to bond together supports of a different and varied nature by an extrusion-lamination process, while combining both a low content of reactive functions, which are of acid, anhydride or epoxide type, in an olefin matrix, and a sufficient content of unsaturated carboxylic acid ester comonomers.

The advantages of such a composition are, besides the versatility of the adhesion as a function of the supports, the possibility of use over a wide temperature range between 220 and 330° C. and at high operating speeds, the insensitivity to moisture uptake and also the reduced odor level emitted, both during its use and in the finished products.

SUMMARY OF THE INVENTION

The present invention relates to an adhesive composition composed of at least one ethylene polymer or copolymer, this composition comprising at least one unsaturated carboxylic acid ester type comonomer, and at least one functional comonomer, that can be used in an extrusion-coating process for application onto a support or in an extrusion-lamination process for bonding several supports, having the same or a different nature, together, over a wide temperature range, characterized in that said composition has a content of unsaturated carboxylic acid ester type comonomer(s) greater than 5% by weight and that the functional comonomer is composed of at least one reactive function in the form of an acid, anhydride or epoxide group, the level of which is less than 1% by weight of the composition.

Preferably, the content of reactive function(s) is between 0.05% and 0.9% by weight relative to the composition.

DETAILED DESCRIPTION OF THE INVENTION

The term "ethylene copolymer" as used in the present description relates to polymers of ethylene and one or more comonomers, such as unsaturated monomers, in particular:
 α-olefins having 3 to 30 carbon atoms;
 acetylene compounds;
 conjugated or nonconjugated dienes, such as for example 1,4-hexadiene;
 polyenes;
 carbon monoxide;
 unsaturated carboxylic acid esters, such as for example alkyl (meth)acrylates, the alkyl groups possibly having up to 24 carbon atoms;

vinyl esters of saturated carboxylic acids, such as for example vinyl acetate or propionate;
unsaturated epoxides; and
unsaturated carboxylic acids, their salts and their anhydrides.

Examples of unsaturated dicarboxylic acid anhydrides are especially maleic anhydride, itaconic anhydride, citraconic anhydride and tetrahydrophthalic anhydride.

The ethylene copolymer or copolymers of the composition according to the invention may be diluted in a polyethylene homopolymer or copolymer such as especially low-density polyethylene, linear low-density polyethylene, very low-density polyethylene or metallocene polyethylene, which should result in a decrease of the adhesive characteristics of the compositions thus obtained; however, these adhesive characteristics may remain sufficient for the coating or lamination onto certain envisaged supports.

Preferably, the adhesive composition according to the invention is characterized in that the carboxylic acid ester type comonomer is chosen from alkyl (meth)acrylates, the alkyl group comprising from 1 to 24 carbon atoms.

Examples of alkyl acrylate or methacrylate are especially methyl acrylate, ethyl acrylate, n-butyl acrylate, isobutyl acrylate and 2-ethylhexyl acrylate.

In particular, methyl acrylate and n-butyl acrylate are used.

Preferably, the adhesive composition is characterized in that the functional comonomer is chosen from acid, anhydride or epoxide groups.

Preferably, the group is chosen from compounds of carboxylic acids or their unsaturated carboxylic acid anhydride derivatives.

Examples of unsaturated dicarboxylic acid anhydrides are especially maleic anhydride, itaconic anhydride, citraconic anhydride, and tetrahydrophthalic anhydride. Preferably, it is maleic anhydride that is used.

However, the functional comonomer may comprise an unsaturated epoxide type function.

Examples of unsaturated epoxides are especially
aliphatic glycidyl esters and ethers, such as allyl glycidyl ether, vinyl glycidyl ether, glycidyl maleate and itaconate, glycidyl methacrylate (GMA) and acrylate; and
alicyclic glycidyl esters and ethers, such as glycidyl 1-cyclohex-2-ene ether, diglycidyl 4,5-cyclohexene dicarboxylate, glycidyl 4-cyclohexene carboxylate, glycidyl 5-norbonene-2-methyl-2-carboxylate and diglycidyl endocis-bicyclo[2.2.1]hept-5-ene-2,3-dicarboxylate.

Unsaturated monocarboxylic or dicarboxylic acid type functions, such as (meth)acrylic acid may also be used.

These functional comonomers are preferably attached to the preceding ethylene polymers or copolymers by copolymerization, especially of the high-pressure radical type, however they may also be attached by grafting.

However, these functional comonomers may be copolymerized directly with ethylene or other ethylene comonomers, especially by high-pressure radical polymerization, or grafted to ethylene polymers.

Preferably, the functional comonomer is chosen from unsaturated carboxylic acid anhydrides, and preferably is maleic anhydride.

In particular, the adhesive composition is characterized in that the content of maleic anhydride is between 0.15% and 0.6% by weight of the composition.

Preferably, this adhesive composition is characterized in that the content of alkyl (meth)acrylate type comonomer is between 6 and 40% by weight, and preferably between 10 and 25% by weight, of the composition.

According to another embodiment, the invention relates to a multilayer structure obtained by use of the adhesive composition as described previously, in an extrusion-coating process for application onto a support, said support being chosen from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being oriented or unoriented, metallized or unmetallized, treated or untreated by physical or chemical means, and films coated with a thin inorganic barrier layer, such as polyester (PET SiOx or AlOx).

According to another embodiment, the invention relates to a multilayer structure obtained by use of the adhesive composition of the invention, in an extrusion-lamination process to bond several supports, of different nature, together, characterized in that these supports are chosen from aluminum, paper or board, cellophane, films based on polyethylene, polypropylene, polyamide, polyester, polyvinyl chloride (PVC), polyvinylidene chloride (PVDC) or polyacrylonitrile (PAN) resins, these films being oriented or unoriented, metallized or unmetallized, treated or untreated by physical or chemical means, and films coated with a thin inorganic barrier layer, such as polyester (PET SiOx or AlOx).

In addition, the invention also relates to a method for producing the adhesive composition of the invention, consisting of the high-pressure radical polymerization of all the comonomers in a single step.

The invention also relates to another method of producing the adhesive composition according to the invention, in which at least two ethylene copolymers obtained separately by high-pressure radical polymerization, of which one at least comprises the functional comonomer, are melt-blended.

In this case, it matters little whether this blend has been made prior to the extrusion-coating or extrusion-lamination step, or during this step by dry-blending granules of different compounds comprising the various comonomers.

The adhesive composition of the invention may contain, in addition, other additives, such as antiblocking agents, slip agents, antioxidants, fillers, pigments, dyes and processing aids to facilitate the implementation of this composition in extrusion-coating or extrusion-lamination. Some of these additives may be introduced into the composition in the form of masterbatches.

EXEMPLARY EMBODIMENTS

General Conditions:

Adhesives of different compositions (the characteristics of which are specified in Table 1) were coextruded with one layer of radical low-density polyethylene (rLDPE) and layered on various supports using a COLLIN extrusion-coating line. The operating conditions were chosen so as to impose a draw ratio (ratio of the drawing speed to the speed of the molten polymer exiting the die) of 5.8.

It will be noted that in the composite structures obtained that are described in the following examples, the polyethylene layer may be completely formed by extrusion or partially by lamination on a polyethylene film.

Strips having a width of 15 mm were cut out from the center of the width and along the extrusion direction. The polymer coating was manually separated from the support over a distance of a few centimeters, then the two sections thus released (respectively aluminum and polymer coating) were then each placed in one of the two jaws of an MTS SYNERGIE 200 tensile testing machine. The peel strength was then assessed with a peeling rate of 200 mm/min. Five testpieces were tested per adhesive reference. The tests were carried out in the 15 minutes following the implementation (peel at to) and also after conditioning for one month at 23° C. and 50% relative humidity.

TABLE 1

| Adhesive reference | wt % Acrylate | wt % MAH | wt % MAA | wt % GMA | MFI (2.16 kg @ 190° C.) |
|---|---|---|---|---|---|
| LDPE | — | — | — | — | 4.1 |
| Resin 1 | 6.2(BuA) | 3.1 | — | — | 5.5 |
| Resin 2 | 18.2(MeA/BuA) | 0.29 | — | — | 9.9 |
| Resin 3 | 13.6(MeA) | 0.32 | — | — | 8.3 |
| Resin 4 | 17.7(BuA) | 2.9 | — | — | 5.8 |
| Resin 5 | 18.2(MeA) | 0.29 | — | — | 7.7 |
| Resin 6 | 21.3(MeA) | 0.3 | — | — | 8.5 |
| Resin 7 | 15.8(MeA/BuA) | — | 0.45 | — | 8.9 |
| Resin 8 | 24.1(MeA) | — | — | 0.8 | 6.9 |

The low-density polyethylene (LDPE) was LACQTENE® LD 304 from Total Petrochemicals.

Resin 1 was the ethylene/butyl acrylate/maleic anhydride (MAH) terpolymer sold under the trademark LOTADER® 3210 by Arkema.

Resin 4 was the ethylene/butyl acrylate/maleic anhydride (MAH) terpolymer sold under the trademark LOTADER® 3410 by Arkema.

Resins 2, 3, 5 to 8 were compositions according to the invention.

Resin 2 was obtained by blending an ethylene/butyl acrylate copolymer containing 18.6 wt % of acrylate with an ethylene/methyl acrylate (17.7 wt %)/maleic anhydride (1 wt %) terpolymer, in a weight ratio of around 70/30, in a FAIREX 45/26 D type single-screw extruder, having a rotation speed of 50 rpm, at a temperature of 150° C.

Resins 3, 5 and 6 were ethylene/methyl acrylate/maleic anhydride terpolymers obtained by high-pressure radical polymerization.

Resin 7 was obtained by blending, in an extruder as for resin 2, an ethylene/methyl acrylate copolymer containing 20 wt % of acrylate with an ethylene/butyl acrylate (6 wt %)/methacrylic acid (1.5 wt %) terpolymer, in a weight ratio of around 70/30.

Resin 8 was obtained by blending, in an extruder as for the preceding resin, an ethylene/methyl acrylate copolymer containing 24 wt % of acrylate with an ethylene/methyl acrylate (25 wt %)/glycidyl methacrylate (8 wt %) terpolymer, (sold under the trademark LOTADER® AX 8900 by Arkema), in a weight ratio of around 90/10.

The abbreviations MeA, BuA, MAH, MAA and GMA denote methyl acrylate, butyl acrylate, maleic anhydride, methacrylic acid and glycidyl methacrylate respectively.

MFI is the melt flow index measured at a temperature of 190° C. under a load of 2.16 kg (according to standard ASTM D 1238).

Example 1

The support used was an aluminum film having a thickness of 37 μm. The structure produced was: aluminum (37 μm)/adhesive (10 μm)/rLDPE (100 μm). Two extrusions temperatures (290-300° C. and 310-320° C. respectively) were assessed for each of the adhesives tested (including those being used as comparative adhesives).

The results obtained are given in Table 2 below (the values measured are followed by the standard deviation):

TABLE 2

| Adhesive reference | Peel strength at $t_0$ (N/15 mm) | Peel strength at 1 month (N/15 mm) |
|---|---|---|
| Material temperature: 290-300° C. | | |
| Resin 1 (comparative) | 2.9 ± 0.1 | 2.5 ± 0.1 |
| Resin 2 | 3.9 ± 0.3 | 4.2 ± 0.2 |
| Resin 3 | 3.7 ± 0.1 | 3.7 ± 0.1 |
| Resin 4 (comparative) | 3.8 ± 0.1 | 3.5 ± 0.1 |
| LDPE (comparative) | 1 ± 0.05 | 0.18 ± 0.05 |
| 80% resin 1 in LDPE (comparative) | 2.2 ± 0.1 | 2.1 ± 0.1 |
| 20% resin 1 in LDPE (comparative) | 1.6 ± 0.1 | 0.8 ± 0.1 |
| Material temperature: 310-320° C. | | |
| Resin 1 (comparative) | 3.3 ± 0.1 | 3.1 ± 0.0 |
| Resin 2 | 5.7 ± 0.1 | 5.9 ± 0.0 |
| Resin 3 | 5.4 ± 0.1 | 5.0 ± 0.0 |
| Resin 7 | 5.0 ± 0.1 | 5.2 ± 0.0 |
| Resin 4 (comparative) | 5.0 ± 0.1 | 4.4 ± 0.1 |
| LDPE (comparative) | 1.3 ± 0.1 | 0.8 ± 0.1 |
| 80% resin 1 in LDPE (comparative) | 2.9 ± 0.1 | 2.8 ± 0.1 |
| 20% resin 1 in LDPE (comparative) | 1.9 ± 0.1 | 1.8 ± 0.1 |

In particular, the improved adhesion characteristics of the compositions according to the invention (resins 2, 3 and 7) were observed, especially after aging, relative to the normal adhesives used in extrusion (resins 1 and 4, comparative tests).

In addition, the blend of resin 1 with LDPE, according to the teaching of Examples 9 to 13 of Patent EP 222 789, cited as prior art, gave even lower adhesion values than with resin 1 used alone.

Example 2

For this example, two oriented polyethylene terephthalate (OPET) supports of reference MYLAR 813 (14 μm thick) and MYLAR 800 (12 μm) from DuPont Teijin were used.

In the case of MYLAR 813, the adhesive was deposited onto the side of the film that had not been treated by physical or chemical means (by a "primer"), and in both cases a corona treatment was applied in-line to the PET film just before the deposition of the adhesive.

The structure produced was: PET film/adhesive (10 μm)/rLDPE (30 μm). The results obtained are given in Table 3 below:

TABLE 3

| Adhesive reference | Nature of the support | Average material temperature (° C.) | Peel strength at $t_0$ (N/15 mm) | Peel strength at 1 month (N/15 mm) |
|---|---|---|---|---|
| Resin 1 (comparative) | MYLAR 813 thickness 14 μm | 310 | 0.6 ± 0 | 2.5 ± 0.5 |
| Resin 4 (comparative) | | 310 | 2.8 ± 0 | 4.7 ± 0.2 |
| Resin 5 | | 310 | 4.8 ± 0.5 | 6 ± 0.2 |
| Resin 6 | | 310 | 5.2 ± 0.2 | 6.1 ± 0.3 |
| Resin 6 | MYLAR 800 thickness 12 μm | 290 | 2.4 ± 0.1 | 4.6 ± 0.1 |
| Resin 6 | | 300 | 2.5 ± 0.1 | 4.8 ± 0.3 |
| Resin 6 | | 310 | 3.9 ± 0.3 | 5.2 ± 0.2 |
| Resin 7 | | 310 | 3.2 ± 0.1 | 5.0 ± 0.2 |
| Resin 8 | | 310 | 5.1 ± 0.1 | 5.8 ± 0.2 |
| Resin 6 | | 320 | 4.8 ± 0.2 | 4.7 ± 0.1 |

The highly improved adhesion characteristics of the compositions according to the invention (resins 5, 6, 7 and 8) were observed relative to the comparative resins 1 and 4.

Example 3

In this example, the adhesives were deposited onto an oriented nylon-6 film having a thickness of 25 μm. The structure of the samples was the following: OPA film/adhesive (10 μm)/rLDPE (85 μm). The results obtained are given in Table 4 below:

TABLE 4

| Adhesive reference | Peel strength at $t_0$ (N/15 mm) | Peel strength at 1 month (N/15 mm) |
|---|---|---|
| Material temperature: 310-320° C. | | |
| Resin 1 | 1.7 ± 0.2 | 4.7 ± 0.1 |
| Resin 2 | 3.7 ± 0.1 | 5.5 ± 0.1 |
| Resin 4 | 4.1 ± 0.1 | 7.4 ± 0.2 |
| Resin 6 | 5.8 ± 0.2 | 7.5 ± 0.1 |

Resin 6 according to the invention also had improved adhesion characteristics on this type of substrate made from oriented polyamide.

In all the tests, a large reduction in the odors emitted during the processing of the resins according to the invention, and in the final products, was also observed relative to conventional resins.

In addition, the resins of the invention in granule form have a remarkable insensitivity to moisture.

The invention claimed is:

1. A multilayer structure comprising:
a) an adhesive composition consisting of:
at least one ethylene polymer or copolymer;
at least one alkyl methacrylate, the alkyl group having from 1 to 24 carbon atoms; and
at least one functional comonomer,
wherein said alkyl methacrylate(s) are present at from 6 to 25 weight percent of the composition and
wherein said functional comonomer comprises at least one reactive function in the form of maleic anhydride, wherein in said adhesive composition the content of maleic anhydride is between 0.15% and 0.6% by weight of the composition, wherein the adhesive composition is extruded at temperatures ranging from 290 to 320° C. to form the multilayer structure, and
b) a support, wherein said support is chosen from aluminum; paper or board; cellophane; films based on polyethylene, polypropylene, polyamide, polyester, polyvinyl chloride (PVC), polyvinylidene chloride (PVDC) or polyacrylonitrile (PAN) resins, wherein said films are oriented or unoriented, metallized or unmetallized, treated or untreated by physical or chemical means; and films coated with a thin inorganic barrier layer, wherein said multi-layer structure is formed by an extrusion-coating process or an extrusion lamination process.

2. A multilayer structure comprising:
a) an adhesive composition consisting of:
at least one ethylene polymer or copolymer;
at least one alkyl methacrylate, the alkyl group having from 1 to 24 carbon atoms; and
at least one functional comonomer,
wherein said alkyl methacrylate(s) are present at from 6 to 25 weight percent of the composition and
wherein said functional comonomer comprises at least one reactive function in the form of acid, anhydride or epoxide group, the level of which is less than 1% by weight of the composition, wherein the adhesive composition is extruded at temperatures ranging from 300° C. to 320° C. to form the multilayer structure, and
b) a support, wherein said support is a polyethylene terephthalate;
wherein said multi-layer structure is formed by an extrusion-coating process or an extrusion lamination process.

3. The multilayer structure as claimed in claim 2, wherein the adhesive composition consists of the at least one ethylene polymer or copolymer, at least one alkyl methacrylate, and the at least one functional comonomer.

4. A multilayer structure comprising:
a) an adhesive composition comprising at least one ethylene polymer or copolymer, at least one unsaturated carboxylic acid ester type comonomer, and at least one functional comonomer, wherein said unsaturated carboxylic acid ester type comonomer is at least one alkyl methacrylate, the alkyl group having from 1 to 24 carbon atoms, and wherein said alkyl methacrylate(s) are present at from 10 to 25 weight percent of the composition and wherein said functional comonomer is maleic anhydride, the level of which is between 0.05% and 0.9% by weight of the composition, wherein the adhesive composition is formed by high-pressure radical polymerization of all the comonomers in a single step, wherein the adhesive composition is extruded at temperatures ranging from 290° C. to 300° C. to form the multilayer structure, and
b) a support, wherein said support is aluminum film; wherein said multi-layer structure is formed by an extrusion-coating process or an extrusion lamination process.

5. The multilayer structure as claimed in claim 4, wherein the adhesive composition consists of the at least one ethylene polymer or copolymer, at least one alkyl methacrylate, and the at least one functional comonomer.

6. A multilayer structure comprising:
a) an adhesive composition comprising at least one ethylene polymer or copolymer, at least one unsaturated carboxylic acid ester type comonomer, and at least one functional comonomer, wherein said unsaturated carboxylic acid ester type comonomer is at least one alkyl methacrylate, the alkyl group having from 1 to 24 carbon atoms, and wherein said alkyl methacrylate(s) are present at from 10 to 25 weight percent of the composition and
wherein said functional comonomer comprises at least one reactive function in the form of an acid, anhydride or epoxide group, the level of which is less than 1% by weight of the composition, wherein the adhesive composition is extruded at temperatures ranging from 310° C. to 320° C. to form the multilayer structure, and
b) a support, wherein said support is chosen from aluminum film, wherein said multi-layer structure is formed by an extrusion-coating process or an extrusion lamination process.

7. The multilayer structure as claimed in claim 6, wherein in said adhesive composition the functional comonomer is chosen from unsaturated carboxylic acid anhydrides.

8. The multilayer structure as claimed in claim 6, wherein the adhesive composition is formed by melt-blending at least two ethylene copolymers obtained by high-pressure radical polymerization, of which one at least comprises the functional comonomer.

9. The multilayer structure as claimed in claim 6, wherein the adhesive composition consists of the at least one ethylene polymer or copolymer, at least one alkyl methacrylate, and the at least one functional comonomer.

10. The multilayer structure as claimed in claim 6, wherein in said adhesive composition said functional monomer is maleic anhydride.

11. A multilayer structure according to claim 6, wherein the adhesive composition is formed by high-pressure radical polymerization of all the comonomers in a single step.

12. A multilayer structure according to claim 6, wherein the functional comonomer comprises at least one reactive function in the form of an acid, anhydride or epoxide group, the level of which is between 0.05% and 0.9% by weight of the composition.

13. The multilayer structure as claimed in claim 6, wherein in said adhesive composition said functional monomer is maleic anhydride.

\* \* \* \* \*